July 6, 1965

F. R. HICKERSON 3,192,714

VARIABLE THRUST ROCKET ENGINE INCORPORATING
THRUST VECTOR CONTROL

Filed Oct. 31, 1961

INVENTOR.
FREDERICK R. HICKERSON
BY
Arthur U. Collins
ATTORNEY

July 6, 1965  F. R. HICKERSON  3,192,714
VARIABLE THRUST ROCKET ENGINE INCORPORATING
THRUST VECTOR CONTROL
Filed Oct. 31, 1961  2 Sheets-Sheet 2

INVENTOR.
FREDERICK R. HICKERSON
BY
Arthur U. Collins
ATTORNEY

United States Patent Office 3,192,714
Patented July 6, 1965

3,192,714
VARIABLE THRUST ROCKET ENGINE INCORPORATING THRUST VECTOR CONTROL
Frederick R. Hickerson, Newton, N.J., assignor to the United States of America as represented by the Secretary of the Navy
Filed Oct. 31, 1961, Ser. No. 149,132
2 Claims. (Cl. 60—35.54)
(Granted under Title 35, U.S. Code (1952), sec. 266)

The invention described herein may be manufactured and used by or for the Government of the United States of America for governmental purposes without the payment of any royalties thereon or therefor.

This invention relates to manned aircraft and spacecraft and particularly to liquid propellant reaction engines for such craft in which the amount of thrust may be varied and the direction of the craft controlled by deflecting the gases exhausted by the engine.

In liquid propellant reaction engines a fuel and oxidizer are sprayed through injector orifices into a chamber where they are combusted. The combustion gases so produced are ejected through a nozzle to provide a forward thrust.

The performance of these reaction engines, for one thing, depends on the ratio of the combustion chamber pressure to the exhaust pressure. Throttling them causes a drop in the combustion chamber pressure and thereby the ratio referred to. At high altitudes the ambient exhaust pressure is low, or nil, and the engine performance is, theoretically, hardly affected by throttling. But at low altitudes, where the ambient exhaust pressure is significant, performance is greatly affected with throttling of such engines.

Various systems have been devised for throttling these engines. For instance, the pressure at which the propellants are injected into the combustor is varied, or the number of injector orifices feeding the combustor is changed. These systems, however, affect chamber pressure and give poor performance at low altitude.

Vector control of the craft, pitch and yaw changes, has been obtained by deflecting the exhaust stream in a desired direction by installing vanes or jetavators in the exhaust stream. Inasmuch as such deflectors are subjected to the jet stream they have the disadvantage of creating a drag on the craft and are themselves affected by the intense heat.

This invention provides a liquid propellant rocket engine which maintains a constant combustion chamber pressure during throttling at high or low altitudes, and thereby a high performance with a significant conservation of propellants.

It is also an object of this invention to provide a liquid bi-propellant reaction engine having a constant pressure in the combustion chamber in which the quantity of propellants and exhaust throat area are simultaneously adjusted with throttling.

A further object of this invention is to provide a reaction engine having a pintle for varying the exhaust throat area which may be inclined to deflect the exhaust gases for steering purposes.

Another object is to provide a throttling assembly which is capable of action as a steering means.

It is also an object to provide steering means which is simple in construction and useable on single jet engines for yaw and pitch directional control.

The invention, as well as other objects of it, will be readily appreciated from the following detailed description when read in connection with the accompanying drawing wherein.

Figure 1:
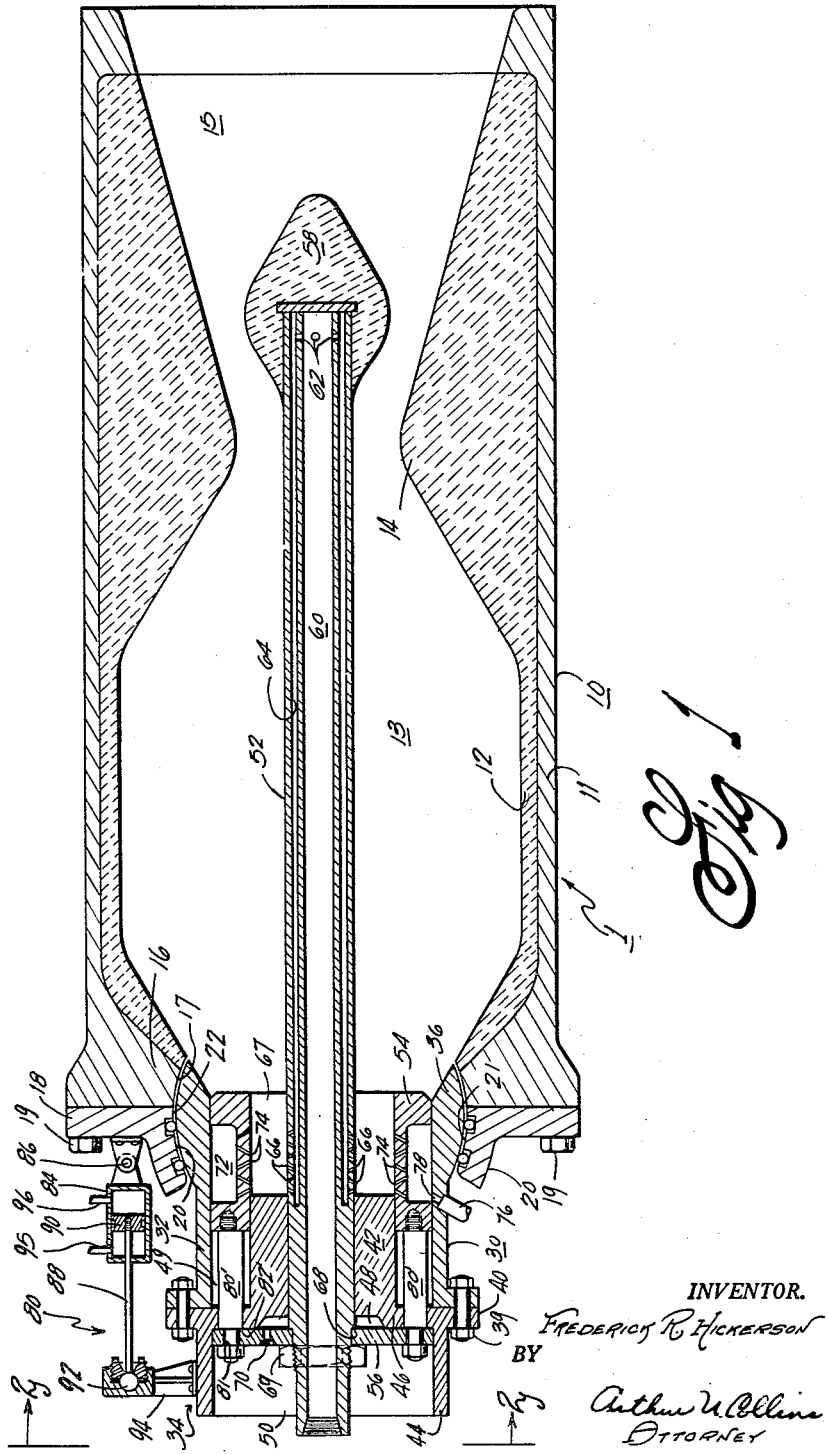
FIGURE 1 is a longitudinal sectional view of a reaction engine employing the invention showing the position of the elements when the throttle is fully open.

In accordance with the invention, a throttling assembly, including a shuttle and pintle, is movably mounted within the engine for varying the quantity of propellants and the exhaust throat area. The construction permits maintaining a constant combustion chamber pressure for all degrees of throttling. The throttling assembly is also capable of assuming various angular positions which incline the pintle axis relative the combustor axis. The shape of the exhaust throat opening through which the reaction gases are exhausted is changed when the throttle assembly is inclined so that the gases flow to one side of the pintle. The reaction of the exhausted gases deflected by the pintle, causes the craft to alter its direction accordingly. Yaw and pitch directions only are preferably so controlled.

In the drawing, the reaction engine indicated at 1 incorporates the invention and is suitable for mounting in an aircraft, not shown. It comprises, broadly a fixed housing or combustor 10 in which the propellants are combusted, a movable housing 30 pivotally coupled to the forward end of the combustor through which the propellants enter the combustor, a throttling assembly 50 capable of movement with and relative the movable housing, and actuating mechanisms 80 and 82 by which the movable housing may be inclined relative the combustor.

The combustor 10 has a tubular shell 11, open at both ends and covered with a ceramic liner 12 on its inner surface. At the forward portion of the shell, the liner 12 is of uniform thickness and defines a combustion chamber 13 in which propellants are combusted. At an intermediate point, liner 12 thickens, tapering inwardly, as viewed to the rear, and creates a constricted passage or throat 14 for the exhausting gases. For the remainder of the shell the liner thins out into an outwardly expanding exhaust opening or nozzle 15.

The forward end of the combustor shell 11 has an inwardly directed flange 16 with a trunacted spherical surface or seat 17 normal to the combustor axis. An end ring 18, secured by bolts 19 to the end of combustor shell 11, has a forwardly extending projection 20 with an oppositely directed spherical surface 21 or seat. Together seats 17 and 21 form a socket 22 for holding a ball against axial movement while allowing turning.

The movable housing 30 is two axially united parts, an injector casing 32 and a throttling assembly support 34. The injector casing 32, an open ended tube in form, has an enlargement 36 on the outer surface of rearward end that is shaped like a ball and which is seated for turning in combustor socket 22. The forward end of the casing is flared outwardly into a flange and is joined by bolts 39 to an abutting flange 40 extending from throttle assembly support 34.

Support 34 is formed by a pair of axially aligned tubular members 42 and 44 of different diameters that are integrally joined at their adjacent ends through a web 46. Flange 40 is an outward extension of this web. The smaller diameter tube, 42, projects rearwardly partly into the injector casing 32 and has a groove 48 on the surface of its forward end for a purpose given hereafter. Its outer periphery is spaced from and concentric with the inner surface of injector casing 32 defining an annular space or shuttle cylinder 49 opening rearwardly to combustor chamber 13.

Throttling assembly, 50 includes a pintle 52, an injector shuttle 54 and a disk like piston 56 which yokes them together. Pintle 52 is a tubular member mounted for longitudinal movement in the central passage of tube 42 of support 34. It extends through combustor chamber 13 and terminates in a closed end on the rearward side of throat 14 where it carries a bulbous ceramic member 58 adapted to reduce the area of throat 14 as it is drawn into it to impede flow therethrough. A central passage 60, open at the forward end of the pintle, runs substantially to the pintle's rearward end and is connected by radial apertures 62 at that point to a concentric, annular passage 64. The latter extends forwardly to where the pintle is supported. Fuel injector outlets 66 are provided which connect annular passage 64 to the cavity, 67, in injector casing 32. The pintle serves as a conduit for fuel to combustor chamber 13 by way of injector cavity 67. In the course of its flow, the fuel cools the pintle and is itself preheated.

A forward portion of pintle 52 is externally reduced to create a shoulder 68. Piston 56, disk-like in shape, is carried on pintle 52 and secured between shoulder 68 and a nut 69. The outer peripheral surface of piston 56 is in sliding engagement with the inner wall of large tube 44 of throttle assembly support 34.

Shuttle 54 is an annular member disposed in cylinder 49 for controlling the quantity of oxidizer admitted for combustion. It has an annular groove or oxidizer well 72 in its outer surface connected by axially spaced outlets 74 piercing its inner peripheral wall. Oxidizer material is admitted to well 72 from an unshown source through a conduit 76 connected to an inlet aperture 78 in injector casing 32. Shuttle 54 is in sealing engagement with the peripheral walls forming its cylinder 49 and is adapted for axial movement with travel of piston 56. Axial movement of shuttle 54 in a forward direction covers outlets 74 denying exit to fluid from oxidizer well 72; rearward movement achieves an opposite result.

Shuttle 54 is attached to piston 56 by bolts 80 extending through holes 81 in support web 46. Shoulders 82' on bolts 80' keep shuttle 54 and piston 56 separated so that oxidizer outlets 74 overlie fuel injector outlets 66.

An aperture 70 axially penetrates piston 56 and provides an access to groove 48 in support tube 42 for pressurized fluid from a source, not shown, by which piston 56 may be moved forward. No provision is made for rearward movement, since this is achieved by the force of the exhausting gases acting on pintle 52. Forward movement of piston 56 will move shuttle 54 and pintle 52 so that oxidizer outlets 74 and fuel outlets 66 are simultaneously covered by support tube 42.

Figure 2:
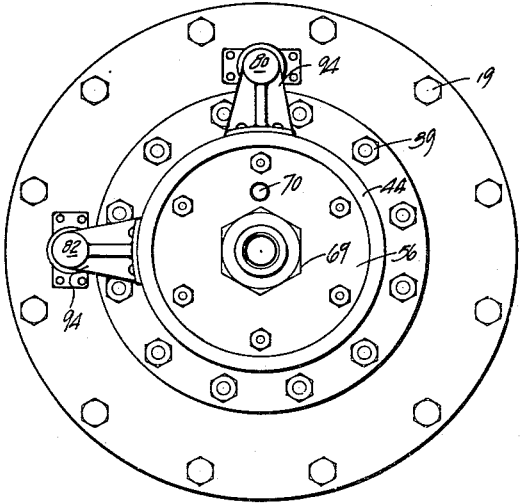
FIGURE 2 is an end view of the engine viewed in a rearward direction.

The actuating mechanism by which movable housing 30, and pintle 52 thereby, is inclined relative combustor 10 for purposes of steering the craft include two hydraulic units 80 and 82, FIGURE 2. Each of the units, 80 and 82, are similarly mounted on the external surface of the engine but normal to each other and, therefore, shift movable housing 30 in separate perpendicular planes. Movement in these planes satisfies yaw and pitch requirements.

Since units 80 and 82 are alike, only unit 80 will be described. Unit 80, FIGURE 1, has a hydraulic cylinder 84 pivotally attached by its rearward end in a conventional manner, as by the hinge, 86, shown, to the outer end surface of combustor end plate 18. A piston rod, 88, connected to piston 90 extends forwardly through cylinder 84 and terminates in a ball joint 92 in a standard 94 carried on the outer surface of throttle assembly support 34. Pressurized fluid from an unshown source has entrance to either side of piston 90 through conduits 95 and 96 so that the piston can be moved in either direction. The direction of movement of movable housing 30 is, of course, determined by that of piston 90.

Figure 3:
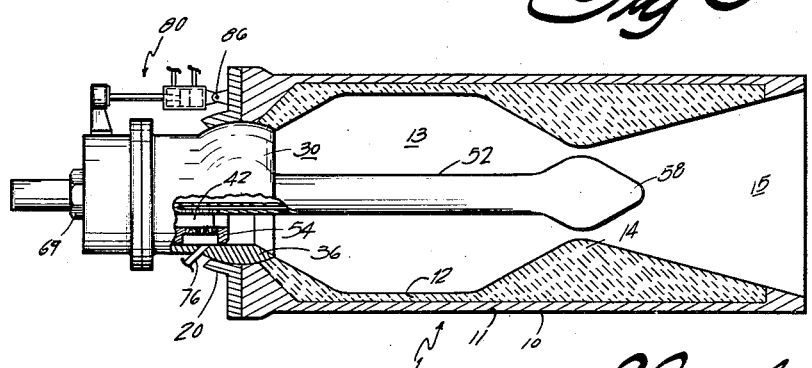
FIGURE 3 is a view somewhat similar to FIGURE 1 showing the engine substantially fully throttled.

In operation of the engine, with the throttle fully open (FIG. 1), the oxidizer outlets 74 and fuel outlets 66 are uncovered. The oxidizer and fuel propellants are introduced as conical sprays into the injector cavity 67 from which they enter the combustor chamber 13. The heat in the combustor chamber or that of an igniter, not shown, ignites the propellants. To throttle the engine, pressurized fluid is admitted to the groove or chamber 48 rearward of piston 56 forcing it forward. Pintle 52 and shuttle 54 are consequently moved forward (FIG. 3), whereby some of axially aligned oxidizer and fuel apertures, 74 and 66, are covered. The quantity of propellants injected for combustion is decreased by this movement, since only a few outlets are uncovered. The area in throat 14 through which the gases are exhausted is likewise decreased, because the bulb-like end 58 on pintle 52 is drawn toward or into the throat. The unitary movement of the shuttle and pintle, with resulting decrease in propellant supply and throat area reduction, thus, causes a thrust fall off without a change in the combustor pressure, i.e., keeping it constant.

Figure 4:
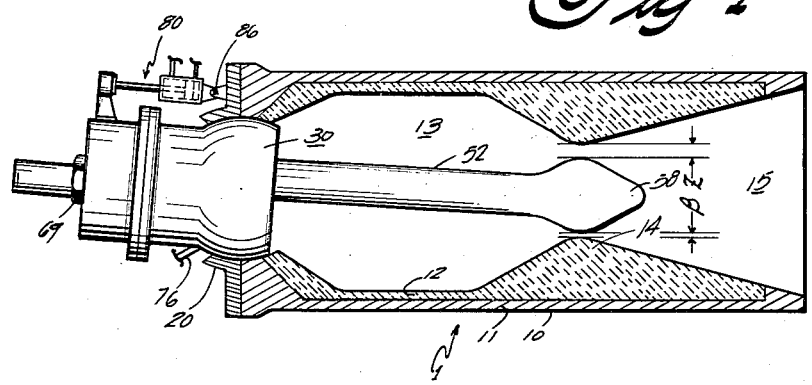
FIGURE 4 is like FIGURE 3 but shows the position of the pintle for changing the pitch direction of the craft.

To effect steering in a pitch or yaw direction, one of the units 80 or 82 is actuated so that the pintle 52 is inclined in the desired direction, as shown in FIG. 4. In this position the bulbous end of pintle 52 is closer to the wall of throat 14 at one side than on its opposite side; thus, the space B is smaller than that at Z. More of the combusted gases are exhausted through the larger area, Z, and the direction of the thrust is in accordance therewith.

Some of the valves and the elements for a complete system by which piston 56 or units 80 and 82 are actuated are not shown. Conventional devices are adequate and their installation is deemed within the purview of those acquired with the art.

Although only one embodiment of the invention has been shown and described, obviously various modifications are possible in light of the above teachings. It is therefore to be understood that within the scope of the appended claims the invention may be practiced otherwise than as specifically described.

What is claimed is:

1. A variable thrust reaction engine comprising an open ended combustor enclosing a combustion chamber and a throat area, said combustor having a spherically shaped inner surface coaxial with the combustor axis in the forward end thereof, a tubular injector casing defining within it an injection chamber contiguous to said combustion chamber and having a spherically shaped outer surface mated with the combustor's spherically shaped inner surface for pivotal movement thereof, a tubular pintle support secured to the forward end of said injector casing having intermediate its ends an internal web supporting a tubular projection extending partly forward into said injection chamber and concentrically spaced therefrom, actuating means externally disposed of said engine and articulately connected to said combustor and injector casing for inclining said casing relative said combustor with actuation thereof, an annular shuttle mounted for axial movement on said tubular projection having a propellant cavity therein and a plurality of axially spaced outlets in its inner wall for passing a propellant from said cavity into said injection area, an elongated pintle mounted for axial movement in said tubular projector having a bulbous rearward end for varying the size of said throat area with movement of the pintle and having a plurality of axially spaced outlets in its outer surface for introducing a second propellant into said injection area, piston means mounted on said pintle and disposed for movement in said pintle support at the forward end of said web, means securing said shuttle to said piston, and means for introducing fluid pressure between said web and said piston for axial movement of said piston, whereby said pintle and shuttle are moved axially and the outlets therein are sequentially covered or uncovered by said tubular projection of said pintle support and said bulbous end of said pintle varies said throat area.

2. The engine of claim 1 wherein the inner surface of said combustor and said bulbous rearward end of said pintle are covered with a ceramic material.

References Cited by the Examiner

UNITED STATES PATENTS

| 2,551,115 | 5/51 | Goddard | 60—35.6 |
| 2,870,603 | 7/59 | Long | 60—35.6 |
| 2,981,061 | 4/61 | Lilligren | 60—35.55 |
| 3,016,697 | 1/62 | Sternberg et. al | 60—35.6 |

SAMUEL LEVINE, *Primary Examiner.*

SAMUEL FEINBERG, BENJAMIN A. BORCHELT, *Examiners.*